United States Patent [19]

Lew et al.

[11] Patent Number: 5,440,926
[45] Date of Patent: Aug. 15, 1995

[54] FOLDING-UNFOLDING ROTARY VANE METER-MOTOR-PUMP

[76] Inventors: Hyok S. Lew; Hyon S. Lew; Yon K. Lew, all of 7890 Oak St., Arvada, Colo. 80005

[21] Appl. No.: 185,206

[22] Filed: Jan. 24, 1994

[51] Int. Cl.$^6$ ............................ G01F 3/08; F01C 1/00
[52] U.S. Cl. ...................................... 73/259; 418/37
[58] Field of Search ................. 73/259, 260, 253; 418/37

[56] References Cited

U.S. PATENT DOCUMENTS

| | | | |
|---|---|---|---|
| 2,243,653 | 5/1941 | Rodaway | 418/37 |
| 3,269,182 | 8/1966 | Granberg | 73/259 |
| 3,312,200 | 4/1967 | Benson | 418/37 |
| 4,022,552 | 5/1977 | Wilson | 418/37 |

Primary Examiner—Richard E. Chilcot, Jr.
Assistant Examiner—Harshad Patel

[57] ABSTRACT

A positive displacement fluid machine comprises a body including a circular cylindrical cavity with two closed ends and two port openings respectively open to the two opposite halves of the cylindrical cavity respectively located on two opposite sides of a plane of symmetry, a vane assembly including a plurality of vanes disposed in a radially extending pattern from a central shaft rotatably and pivotally supporting the plurality of the vanes, which vane assembly is disposed within the circular cylindrical cavity in a coaxial relationship therebetween wherein the radial edges of the vanes slide on the circular cylindrical wall of the cylindrical cavity, and a cam follower-guide mechanism controlling separation angle between adjacent vanes in such a way that the separation angle between adjacent vanes increases from a minimum value to a maximum value in one of the two opposite halves of the cylindrical cavity and decreases from the maximum value to the minmum value in the other of the two opposite halves of the cylindrical cavity.

20 Claims, 3 Drawing Sheets

FOLDING-UNFOLDING ROTARY VANE METER-MOTOR-PUMP

FIELD OF THE INVENTION

This invention relates to a positive displacement fluid machine that functions as a flowmeter, fluid motor or pump, which comprises a plurality of rotary vanes assembled into a radially extending combination about an axis of rotation, that is disposed rotatably about the axis of rotation within a circular cylindrical cavity in a relationship wherein the radial edges of the vanes slide on the circular cylindrical wall of the circular cylindrical cavity during the rotation of the vane assembly, and a cam follower-guide mechanism controlling the separation angle between adjacent vanes in such a way that the separation angle between adjacent vanes increases during a first 180 degree rotation of the vanes sweeping by a first port open to a first half of the circular cylindrical cavity and decreases in a second 180 degree rotation of the vanes sweeping by a second port open to a second half of the circular cylindrical cavity.

BACKGROUND OF INVENTION

In the opinion of the inventors of the present invention, the type of compressor or pump known by the name of "sliding vane compressor or pump" is one of the most unintelligent and impractical devices ever put into practice in the field of fluid handling and measuring. The inventors of the present invention have invented a couple of different versions of the positive displacement fluid machine known as the "extending-retracting vane" or "folding-unfolding flap" meter-motor-pump as an alternative to the "sliding vane" compressor or pump, which inventions are described in U.S. Pat. Nos. 5,238,373 and 5,269,668, respectively. While those apparatus disclosed in the aforementioned U.S. Patents are suited to function as a flowmeter or pump pumping liquid media, they are ill suited to function as a compressor or pump pumping gaseous media as those apparatus have a large nonzero minimum separation angle between adjacent vanes occuring during rotation of the vane assembly. Such a large nonzero separation angle between adjacent vanes occurring in the returning phase of the vanes from the outlet port side to the inlet port side during the rotation of the vane assembly allows a significant portion of the fluid pumped from the inlet port side to the outlet port side to return to the inlet port side and, consequently, those devices described in the above-mentioned U.S. patents do not function efficiently and effectively as a compressor compressing a compressible fluid media and pumping it therethrough.

BRIEF SUMMARY OF INVENTION

The primary object of the present invention is to provide the "folding-unfolding rotary vane" positive displacement fluid machine, that comprises a plurality of vanes assembled into a radially extending pattern from an axis of rotation of the vane assembly in an arrangement allowing rotating motion of the vane assembly and pivoting motion of the individual vane relative to adjacent vanes about the axis of rotation, which vane assembly is disposed rotatably about the axis of rotation in a cylindrical cavity including two port openings respectively open to the two opposite halves of the cylindrical cavity, and a cam follower-guide mechanism controlling the separation angle between adjacent vanes in such a way that the separation angle increases from a minimum value to a maximum value in a first half of the the cylindrical cavity including one of the two port openings functioning as an inlet port, and decreases from the maximum value to the minimum value in a second half of the cylindrical cavity including the other of the two port openings fuctioning as an outlet port, which cam follower-guide mechanism is incorporated into a combination of at least one end face of the vane assembly and a rotary cam disc disposed adjacent to the end face of the vane assembly in a relationship allowing rotation of the cam disc about a cam axis offset from and parallel to the axis of rotation of the vane assembly.

Another object is to provide the positive displacement fluid machine described in the afore-mentioned primary object of the present invention, wherein the maximum separation angle between adjacent vanes occurring during the rotation of the vane assembly is very much greater than the minimum separation angle between adjacent vanes occurring during the rotation of the vane assembly at an angular position about the axis of rotation diametrically opposite to the angular position whereat the minimum separation angle between adjacent vanes occurs.

A further object is to provide the positive displacement fluid machine described in the afore-mentioned primary object of the present invention, wherein the plurality of vanes are assembled in a radially extending pattern from the axis of rotation of the vane assembly wherein the inner radial extremities of the plurality of vanes are rotatably and pivotally mounted on a central shaft in a piano-hinge like arrangement in a relationship substantially inhibiting leakage of the fluid from one compartment between one adjacent pair of vanes to other compartments between other adjacent pairs of vanes through crevices between the inner radial extremities of the plurality of vanes.

Yet another object is to provide the positive displacement fluid machine described in the afore-mentioned primary object of the present invention, wherein the minimum separation angle between adjacent vanes occurring during the rotation of the vane assembly is substantially equal to zero.

Yet a further object is to provide the positive displacement fluid machine described in the afore-mention primary object of the present invention, wherein the two opposite faces of the individual vane substantially coincide respectively with two planar surfaces radially extending from the axis of rotation of the vane assembly in an oblique angular relationship therebetween.

Still another object is to provide the positive displacement fluid machine described in the afore-mentioned primary object of the present invention, wherein the cam follower-guide mechanism comprises a plurality of cam guide grooves or slots or rails respectively included in the first end faces of the plurality of vanes in a radially extending relationship from the axis of rotation of the vane assembly, and a plurality of cam followers disposed on a circular cylindrical surface coaxial to the cam axis and anchored to one end face of the cam disc rotatable about the cam axis; wherein the plurality of cam followers respectively engage the plurality of cam guide grooves or slots or rails in a sliding relationship.

Still a further object is to provide the positive displacement fluid machine described in the afore-mentioned primary object of the present invention, wherein the cam follower-guide mechanism comprises a plurality of cam followers disposed on a circular cylindrical surface concentric to the axis of rotation of the vane assembly and respectively anchored to the first end faces of the plurality of vanes, and a plurality of cam guide grooves or slots or rails included in one end face of the cam disc rotatable about the cam axis in a radially extending pattern from the cam axis, wherein the plurality of cam followers respectively engage the plurality of cam guide grooves or slots or rails in a sliding relationship.

These and other objects of the present invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
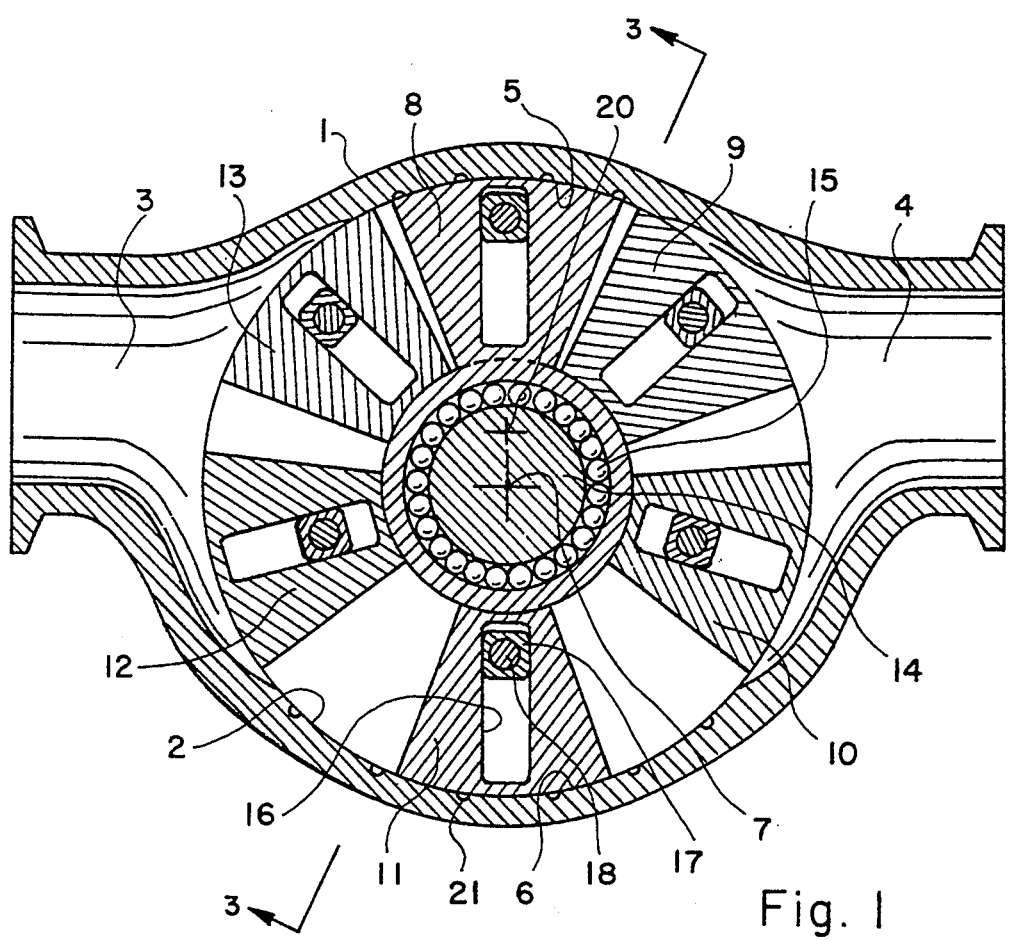
FIG. 1 illustrates a cross section of an embodiment of the positive displacement fluid machine of the present invention.
Figure 2:
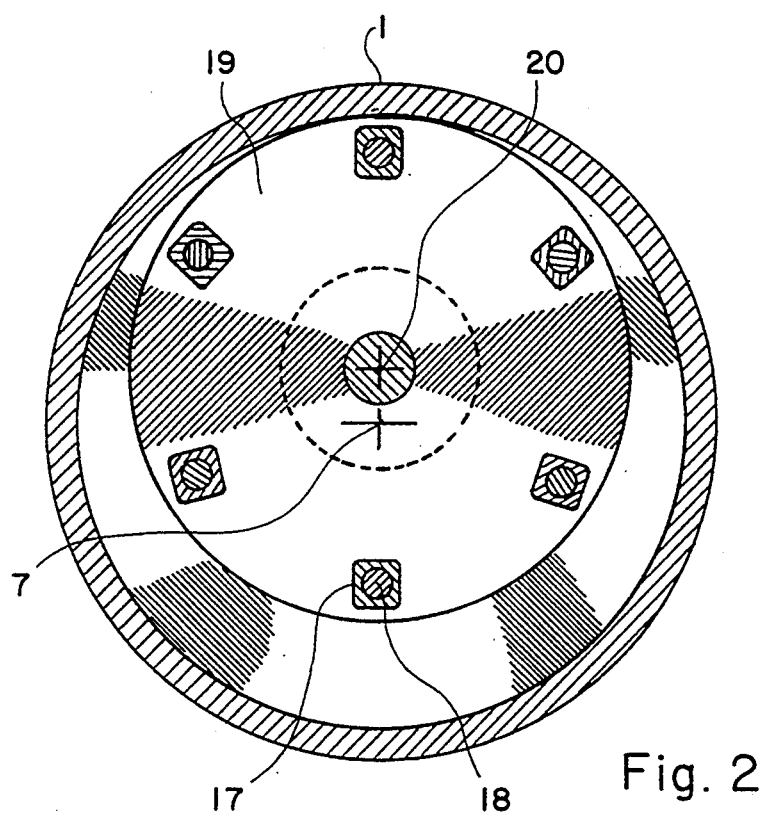
FIG. 2 illustrates an embodiment of the cam disc controlling the separation angle between adjacent vanes included in the embodiment shown in FIG. 1.
Figure 3:
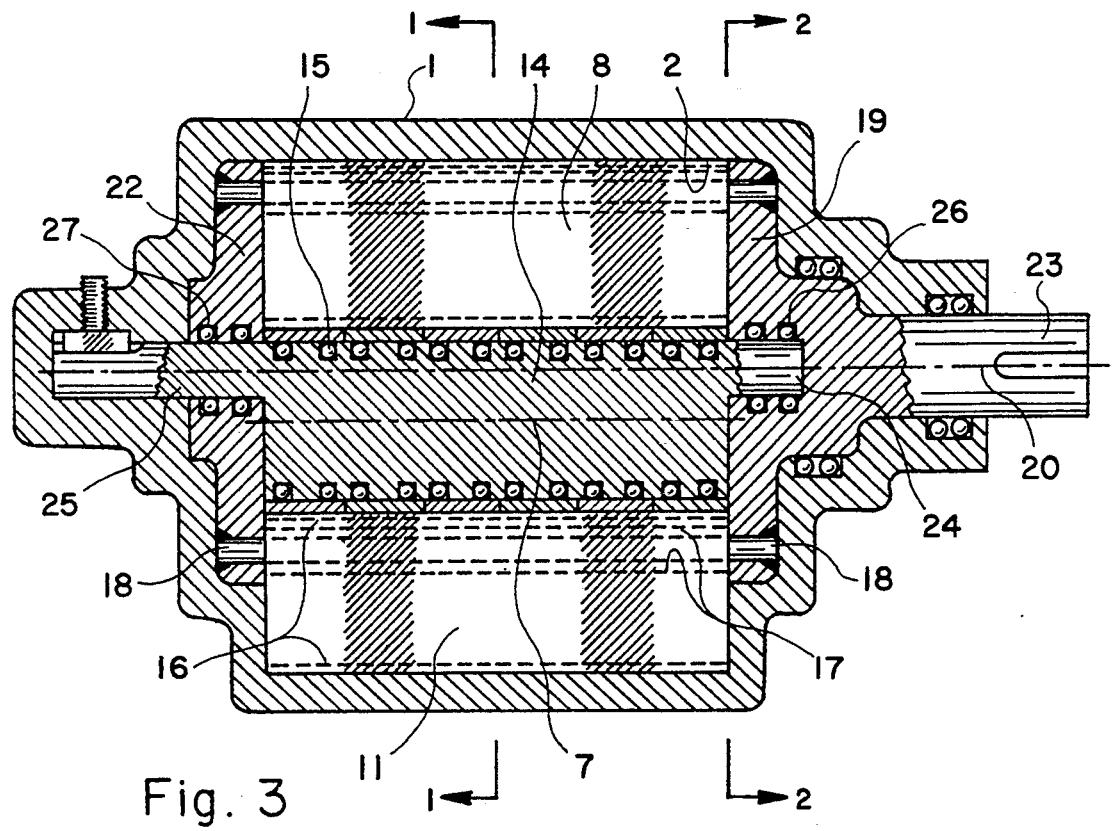
FIG. 3 illustrates another cross section of the positive displacement fluid machine shown in FIG. 1.

In FIG. 1 there is illustrated a cross section of an embodiment of the positive displacement fluid machine constructed in accordance with the principles of the present invention, which cross section is taken along plane 1—1 as shown in FIG. 3. The body 1 of the fluid machine includes a cylindrical cavity 2 with two opposite closed end walls and a cylindrical wall, wherein the cylindrical cavity 2 includes a first port opening 3 open to a first half of the cylindrical cavity 2 and a second port opening 4 open to a second half of the cylindrical cavity 2. At least two diametrically opposite portions 5 and 6 of the cylindrical wall of the cylindrical cavity 2 substantially coincide with a hypothetical circular cylindrical surface with the central axis substantially coinciding with the axis of rotation 7. A plurality of vanes 8, 9, 10, 11, 12, 13, etc. are assembled into a radially extending assembly disposed about the axis of rotation, wherein the individual vane extends radially from the axis of rotation 7. The vane assembly is disposed within the cylindrical cavity 2 in a coaxial relationship therebetween in a relationship allowing rotating motion of the vane assembly and independent pivotal motion of the individual vane relative to adjacent vanes about the axis of rotation 7, which kinematical arrangement of the vanes 8, 9, 10, 11, 12, 13, etc. are facilitated by the central shaft 14 rotatably and pivotally supporting the plurality of vanes in a piano-hinge like arrangement, wherein a plurality of sets of frictionless bearings 15 provide the frictionless rotating and pivotal motion of the individual vanes relative to the central shaft 14. The piano-hinge like mounting of the plurality of vanes on the central shaft 14 substantially inhibits leakage of the fluid from one region between an adjacent pair of vanes to other regions between other adjacent pairs of vanes through crevices existing in the piano-hinge like assembly of the inner radial extremities of the plurality of vanes. Each of the plurality of vanes 8, 9, 10, 11, 12, 13, etc. includes a cam guide groove or slot or rail 16 disposed on at least one end face of the individual vane in a radially extending relationship from the axis of rotation 7, which cam guide groove or slot or rail is engaged by each of a plurality of cam followers comprising a cam bearing 17 rotatably supported by a cam bearing supporting rod or post 18. The cam bearing supporting rods or posts 18 are disposed on a hypothetical circular cylindrical surface concentric to a cam axis 20 and secured to one end face of a cam disc 19 shown in FIG. 2, which cam disc 19 is disposed adjacent to at least one end face of the vane assembly including the plurality of cam guide grooves or slots or rails 16 in a relationship allowing rotating motion of the cam disc 19 about the cam axis 20. The cam bearings 17 enhances the sliding movement between the cam follower and the cam guide groove or slot or rail, and also increase the load bearing capacity required to transmit the torque between the vane assembly and the cam disc. It should be noticed that the axis of rotation 7 of the vane assembly and the cam axis 20 are disposed substantially on a plane of symmetry that divides the cylindrical cavity 2 into two approximately equal opposite halves respectively including the two port openings 3 and 4, wherein each of the two diametrically opposite circular cylindrical portions 5 and 6 of the cylindrical wall of the cylindrical cavity 2 straddles the plane of symmetry. As shown in the particular illustrative embodiment, the individual vanes have a cross sectional geometry wherein the two opposite faces of the individual vane respectively coincide with two planar surface radially extending from the axis of rotation 7 and the outer radial extremity of the individual vane substantially coincides with the hypothetical circular cylindrical surface defined by the two diametrically opposite circular cylindrical portions 5 and 6 of the cylindrical wall of the cylindrical cavity 2, which cross sectional geometry of the individual vane is absolutely required if the minimum separation angle between adjacent vanes occurring during the rotation of the vane assembly must have a very small value or a value close to zero. In an-alternative design, the two opposite faces of the individual vanes may be made to be parallel to one another or obliquely angled therebetween at an angle dictated by the specific design and operating requirements. The circular cylindrical portions 5 and 6 of the cylindrical wall of the cavity 2 under a sliding contact or near sliding contact with the the outer radial edges of the individual vanes may include a plurality of axial or helical indentations 21 in order to reduce the friction detrimental to the rotating motion of the vane assembly. In an alternative design, the axial or helical indentations equivalent to the elements 21 may be included in the outer radial extremities of the individual vanes.

In FIG. 2 there is illustrated another cross section of the positive displacement fluid machine taken along plane 2—2 as shown in FIG. 3, which cross section shows an embodiment of the cam disc 19 that is disposed adjacent to one end face of the vane assembly shown in FIG. 1 in a rotatable relationship about the cam axis 20 also shown in FIG. 1. The plurality of cam followers respectively comprising a bearing 17 and a supporting rod or post 18 are distributed uniformly following a circular cylindrical surface coaxial to the cam axis 20. The cam bearing 17 employed in the particular illustrative embodiment has a square or rectangular outer cylindrical surface that provides a greater bearing load capacity between the cam follower and the cam guide groove or slot 16 engaged by the cam follower in a sliding relationship as shown in FIG. 1. In an alternative design, the outer cylindrical surface of the cam bearing may have a circular cylindrical surface instead of a square or rectangular cylindrical of surface, wherein a plurality of a combination of a single or multiple cam followers disposed on a radial plane extending from the cam axis 20 and anchored to the cam disc 19 may respectively engage the plurality of cam guide grooves included in the vane assembly.

In FIG. 3 there is illustrated a further cross section of the positive displacement fluid machine shown in FIG. 1, which cross section taken along plane 3—3 including the axis of rotation 7 and the cam axis 20 as shown in FIG. 1 shows the combination of the cam discs and the vane assembly, which combination is disposed within the cylindrical cavity 2 included in the body 1 of the positive displacement fluid machine. This particular embodiment of the positive displacement fluid power machine comprises two cam discs 19 and 22 disposed respectively adjacent to the two opposite end faces of the vane assembly. The individual cam guide groove or slot 16 included in the individual vane extends through the individual vane, and the individual cam bearing supporting rod or post 18 extending through and out of the individual cam guide groove or slot 16 is anchored at the two opposite extremities thereof respectively to the two cam discs 19 and 22. As a consequence, the two cam discs 19 and 22 are connected to one another by the plurality of the cam bearing supporting rods or posts 18 in a rigid squirrel cage like structural arrangement. One 19 of the two cam discs 19 and 22 includes a power input or take off shaft 23 extending therefrom and out of the body 1 in coaxial relationship to the cam shaft 20, which shaft rotatably supported by the body 1 transmits power from or to the assembly of the cam discs and the cam bearing suporting rods or post. The central shaft 14 rotatably and pivotably supporting the plurality of vanes about the axis of rotation 7 has two opposite extremities 24 and 25 with a reduced circular cross section coaxial to the cam axis 20; wherein the first reduced extremity 24 of the central shaft 14 is supported by the first cam disc 19 by means of a bearing 26, and the second reduced extremity 25 nonrotatably and rigidly supported by the body 1 supports the second cam disc 25 by means of a bearing 27. It becomes immediately evident that the squirrel cage like assembly of the two cam discs 19 and 22, and the plurality of cam bearing supporting rods or posts 18 is rotatable freely about the cam axis 20 and relative to the body 1. As the rotating motion of the assembly including the two cam discs 19 and 22, and the plurality of cam bearing supporting rods or posts about the cam axis 20 and the rotating motion of the vane assembly about the axis of rotation 7 and relative to the central shaft 14 are kinematically coupled by means of the cam follower-guide mechanism, an input of rotary power to the power transmission shaft 23 rotates the vane assembly, and a rotary motion of the vane assembly delivers rotary power to the power transmission shaft 23. In an alternative design, one 22 of the two cam discs 19 and 22 may be omitted, wherein the cam followers having a stub construction and anchored to the cam disc 19 respectively engage shallow cam guide grooves respectively included in the end faces of the plurality of vanes adjacent to the cam disc 19.

Figure 4:
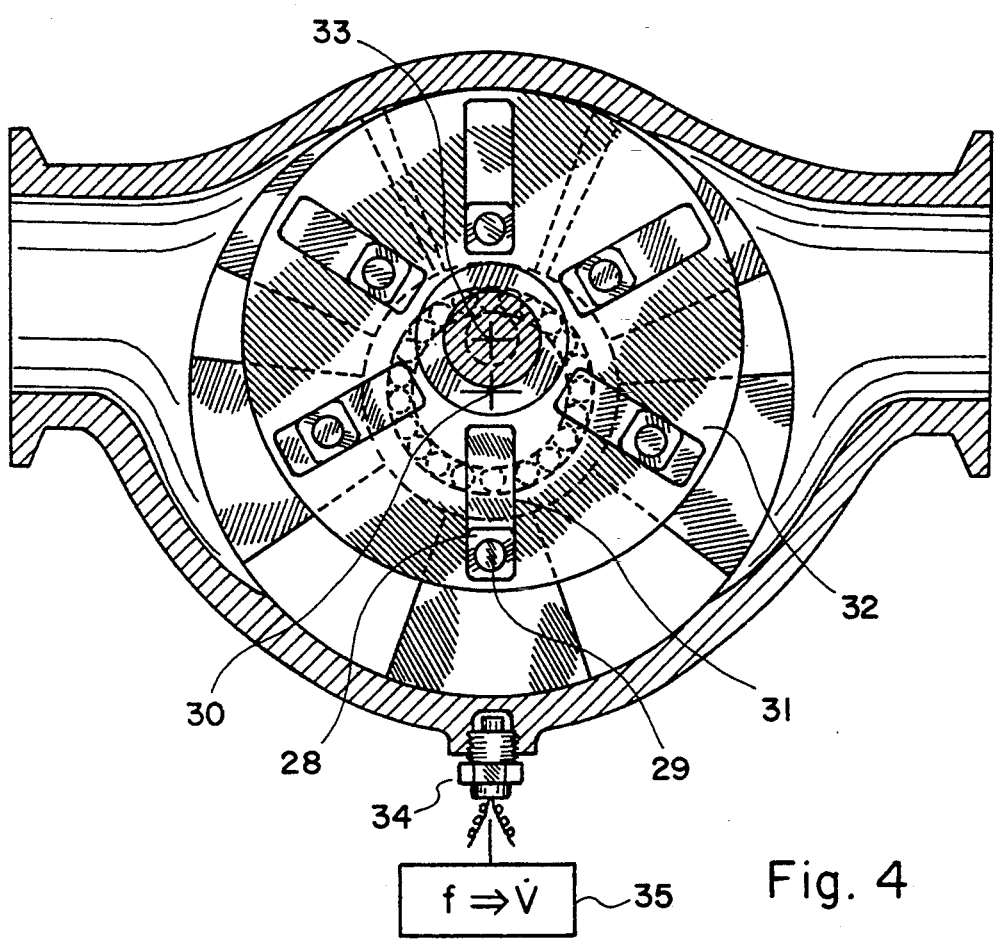
FIG. 4 illustrates a cross section of another embodiment of the positive displacement fluid machine of the present invention.
Figure 5:
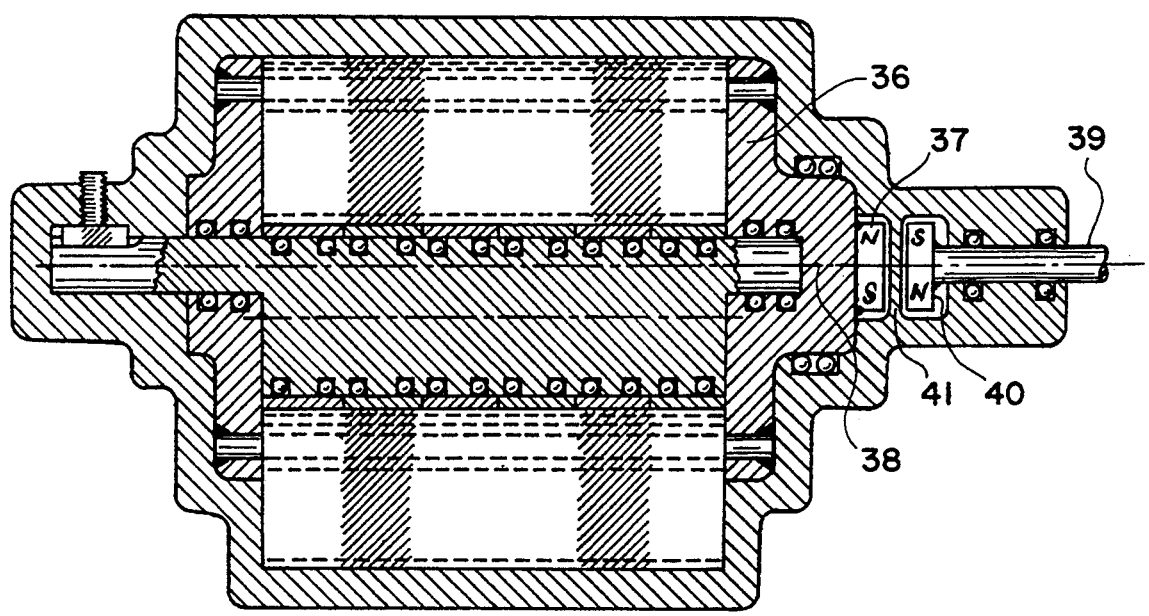
FIG. 5 illustrates a cross section of an embodiment of the flowmeter version of the positive displacement fluid machine of the present invention.

The positive displacement fluid power machine shown and described in conjunction with FIGS. 1, 2 and 3 operates on the following principles: From the illustration shown in FIGS. 1, it becomes immediately clear that, when the cam follower assembly is rotated in the clockwise direction, the increasing spacing between adjacent vanes sweeping by the first port 3 takes in the fluid from the first port 3, and the decreasing spacing between adjacent vanes sweeping by the second port 4 discharges the fluid into the second port. As a consequence, the apparatus becomes a positive displacement compressor or pump when rotary power is put into the apparatus through the power transmission shaft 23. When the fluid is forcibly moved through the apparatus, the apparatus becomes a fluid motor that puts out rotary power through the power transmission shaft 23, or it becomes a positive displacement flowmeter that measures the volume flow of the fluid as a function of the rotary speed of the vane assembly or as the rotary speed of the cam disc. A couple of representative embodiments showing the devices for measuring the rotary speed of the vane assembly or the cam disc assembly are shown in FIGS. 4 and 5. It should be understood that, in order to function as a positive displacement fluid machine, the two diametrically opposite circular cylindrical portions 5 and 6 of the cylindrical wall of the cylindrical cavity, which straddle the plane of symmetry including the axis of rotation 7 and the cam axis 20, must respectively have two sufficiently long circumferential lengths, whereby each of the two diametrically opposite circular cylindrical surfaces 5 and 6 is under a sliding contact or a near sliding contact with the outer circular cylindrical surface or outer radial extremities of at least one individual vane at all instants so that the fluid cannot flow through the apparatus without rotating the vane assembly, and the vane assembly cannot rotate without moving the fluid through the apparatus. When the apparatus is used as a flowmeter or fluid motor or a pump moving a liquid medium, the minimum gap or the minimum separation angle between adjacent vanes sweeping by the first circular cylindrical portion 5 of the cylindrical wall of the cylindrical cavity 2 can have a finite nonzero value. However, when the apparatus is used as a compressor moving a gaseous medium and boosting the pressure of the gaseous medium, the minimum gap or the minimum separation angle between adjacent vanes sweeping by the first circular cylindrical portion 5 of the cylindrical wall of the cylindrical cavity 2 must be very much smaller than the maximum gap or the maximum separation angle between adjacent vanes sweeping by the second circular cylindrical portion 6 of the cylindrical wall of the cylindrical cavity 2, or the minimum gap or the minimum separation angle between adjacent vanes must be negligibly small or substantially close to zero.

In FIG. 4, there is illustrated a cross section of another embodiment of the positive displacement fluid machine of the present invention, that has essentially the same construction as the embodiment shown and described in conjunction with FIGS. 1 and 3 with the following exception: In this particular embodiment, the cam follower-guide mechanism controlling the separation angle between adjacent vanes comprises a plurality of combinations of the cam bearing 28 and the cam bearing supporting rod or post 29 disposed on a hypothetical circular cylindrical surface coaxial to the axis of rotation 30 of the vane assembly and respectively anchored to a first end faces of the plurality of vanes, and a plurality of cam guide grooves or slots or rails 31 included in one face of the cam disc 32 in a radially extending relationship from the cam axis 33, about which cam axis 33 the cam disc 32 is allowed to rotate. The apparatus may include a single cam follower-guide mechanism disposed adjacent to one end face of the vane assembly, or two cam follower-guide mechanisms disposed respectively adjacent to the two opposite end faces of the vane assembly. When the apparatus is used as a flowmeter, the power transmission shaft 23 included in the embodiment shown in FIG. 3 can be omitted or terminated within the body 1 without extending out of the body 1 of the apparatus, and a proximity sensor 34 detecting the existance of a vane at a close proximity thereto or a motion sensor detecting the motion of a vane passing thereby may be employed, wherein the proximity or motion sensor 34 provides a fluctuating or alternating electrical signal having a frequency equal to the frequency of the vane passing thereby. As the frequency of the fluctuating or alternating electrical signal generated by the proximity or motion sensor 34 is proportional to the rotary speed of the vane assembly, the volume flow rate of fluid moving through the apparatus can be determined as a function of the frequency of the fluctuating or alternating electrical signal, which conversion from the frequency f of the fluctuating or alternating electrical signal to the volume flow rate V of fluid is carried out by an electronic data processor 35.

In FIG. 5 there is illustrated another embodiment of the version of the positive displacement fluid machine functioning as a flowmeter. A cam disc 36 without the power transmission shaft 23 included in the embodiment shown in FIG. 3 includes a permanent magnet 37 affixed to and rotating with the cam disc 36 about the cam axis 38. A rotary speed output shaft 39 including a permanent magnet 40 rotatably disposed coaxially to the cam axis 38 rotates at the same rotary speed as that of the cam disc 36, as the two permanent magnets 37 and 38 positively couples the rotating motions of the cam disc 36 and the rotary speed output shaft 39 to one another across a rigid nonmagnetic partition or barrier 41. The volume flow rate of fluid moving through the apparatus is determined from the time rate of rotation of the rotary speed output shaft 39 by an electronic or mechanical data processor.

While the principles of the present invention have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described, and accordingly, all suitable modifications and equivalents may be regarded as falling within the scope of the invention as defined by the claims which follow.

The embodiments of the invention, in which an exclusive property or privilege is claimed, are defined as follows:

1. An apparatus kinematically inter-relating a rotating motion occurring in the apparatus and a flow of fluid media, comprising in combination:

a) a body of apparatus including a cylindrical cavity with a cylindrical wall having at least two diametrically opposite portions substantially coinciding with a circular cylindrical surface, and two opposite planar end walls; said cylindrical cavity including two port openings respectively open to a first half and a second half of the cylindrical cavity respectively located on two opposite sides of a plane of symmetry including the central axis of said circular cylindrical surface, and intersecting with each of said two diametrically opposite portions of the cylindrical wall of the cylindrical cavity;

b) a plurality of vanes assembled into a radially extending pattern from a shaft disposed in a substantially coaxial relationship to the central axis of said circular cylindrical surface, and disposed within the cylindrical cavity, said vanes mounted on the shaft in a relationship allowing rotating motion of the vane assembly about the shaft and pivotal motion of each of the vanes relative to adjacent vanes about the shaft; wherein outer radial extremities of the vanes adjacent to the cylindrical wall of the cylindrical cavity substantially describe said circular cylindrical surface during rotation of the vanes about the shaft, and inner radial extremities of the vanes opposite to the outer radial extremities of the vanes are assembled and mounted on the shaft in a piano-hinge like assembly in a relationship substantially inhibiting leakage of fluid media from one region between one adjacent pair of vanes to other regions between the other adjacent pairs of vanes through crevices existing in said piano-hinge like assembly of the inner radial extremities of the vanes;

c) at least one cam disc disposed adjacent to one of two opposite end faces of the vane assembly rotatably about a cam axis located substantially on said plane of symmetry in an offset and parallel relationship with respect to the central axis of said circular cylindrical surface; and d) at least one cam follower-guide mechanism comprising a plurality of cam guide means and a plurality of cam follower means, wherein the plurality of cam guide means are included in one of the following two elements; at least one of the two opposite end portions of the vane assembly, and a cam disc, wherein the cam guide means are disposed in a radially extending relationship from the axis of rotation of said one of the two elements; and the plurality of cam follower means are secured to the other of said two elements in a distributed relationship on a hypothetical circular cylindrical surface coaxial to the axis of rotation of said the other of the two elements; wherein each of the plurality of cam guide means guides each of the plurality of cam follower means in a sliding relationship in such a way that separation angle between each adjacent pair of the vanes increases from a minimum value to a maximum value in the first half of the cylindrical cavity ,and decreases from the maximum value to the minimum value in the second half of the cylindrical cavity during rotation of the vane assembly about the shaft.

2. An apparatus as defined in claim 1 wherein said combination includes means for measuring rotary speed of the combination of the vane assembly and the cam follower-guide mechanism as a measure of flow rate of fluid media moving through the apparatus.

3. An apparatus as defined in claim 1 wherein said combination includes means for transmitting power from and to the combination of the vane assembly and the cam follower-guide mechanism.

4. An apparatus as defined in claim 1 wherein one of the two diametrically opposite portions of the cylindrical wall of the cylindrical cavity extends over an angle about the shaft at least substantially equal to the minimum separation angle between adjacent pair of the vanes occurring during rotation of the vane assembly, and the other of the two diametrically opposite portions of the cylindrical wall of the cylindrical cavity extends over an angle about the shaft at least substantially equal to the maximum separation angle between adjacent pair of the vanes occurring during rotation of the vane assembly about the shaft.

5. An apparatus as defined in claim 1 wherein each of the plurality of cam guide means is included in at least one axial end portion of each of the plurality of vanes in a radially extending relationship from the shaft, and the plurality of cam follower means extend from an end face of the cam disc adjacent to said one of the two opposite end faces of the vane assembly.

6. An apparatus as defined in claim 5 wherein said combination includes means for measuring rotary speed of the combination of the vane assembly and the cam follower-guide mechanism as a measure of flow rate of fluid media moving through the apparatus.

7. An apparatus as defined in claim 5 wherein said combination includes means for transmitting power from and to tile combination of the vane assembly and the cam follower-guide mechanism.

8. An apparatus as defined in claim 5 wherein one of the two diametrically opposite portions of the cylindrical wall of the cylindrical cavity extends over an angle about the shaft at least substantially equal to the minimum separation angle between adjacent pair of the vanes occurring during rotation of the vane assembly, and the other of the two diametrically opposite portions of the cylindrical wall of the cylindrical cavity extends over an angle about the shaft at least substantially equal to the maximum separation angle between adjacent pair of the vanes occurring during rotation of the vane assembly about the shaft.

9. An apparatus as defined in claim 5 wherein said combination includes another cam follower-guide mechanism comprising a plurality of cam guide means and a plurality of cam follower means; wherein each of the plurality of cam guide means is included in at least the other axial end portion of each of the plurality of vanes in a radially extending relationship from the shaft, and the plurality of cam follower means are secured to another cam disc disposed adjacent to the other of the two opposite end faces of the vane assembly rotatably about said cam axis, in a distributed relationship on said hypothetical circular cylindrical surface; wherein each of the plurality of cam follower means extends from an end face of said another cam disc adjacent to said the other of the two opposite end faces of the vane assembly and engages each of the plurality of cam guide means in a sliding relationship.

10. An apparatus as defined in claim 9 wherein said combination includes means for measuring rotary speed of the combination of the vane assembly and the cam follower-guide mechanism as a measure of flow rate of fluid media moving through the apparatus.

11. An apparatus as defined in claim 9 wherein said combination includes means for transmitting power from and to the combination of the vane assembly and the cam follower-guide mechanism.

12. An apparatus as defined in claim 9 wherein one of the two diametrically opposite portions of the cylindrical wall of the cylindrical cavity extends over an angle about the shaft at least substantially equal to the minimum separation angle between adjacent pair of the vanes occurring during rotation of the vane assembly, and the other of the two diametrically opposite portions of the cylindrical wall of the cylindrical cavity extends over an angle about the shaft at least substantially equal to the maximum separation angle between adjacent pair of the vanes occurring during rotation of the vane assembly about the shaft.

13. An apparatus as defined in claim 1 wherein each of the plurality of cam follower means is secured to one end face of each of the plurality of vanes, and the plurality of cam guide means are included in an end face of the cam disc adjacent to said one of the two opposite end faces of the vane assembly in a radially extending relationship from the cam axs.

14. An apparatus as defined in claim 13 wherein said combination includes means for measuring rotary speed of the combination of the vane assembly and the cam follower-guide mechanism as a measure of flow rate of fluid media moving through the apparatus.

15. An apparatus as defined in claim 13 wherein said combination includes means for transmitting power from and to the combination of the vane assembly and the cam follower-guide mechanism.

16. An apparatus as defined in claim 13 wherein one of the two diametrically opposite portions of the cylindrical wall of the cylindrical cavity extends over an angle about the shaft at least substantially equal to the minimum separation angle between adjacent pair of the vanes occurring during rotation of the vane assembly, and the other of the two diametrically opposite portions of the cylindrical wall of the cylindrical cavity extends over an angle about the shaft at least substantially equal to the maximum separation angle between adjacent pair of the vanes occurring during rotation of the vane assembly about the shaft 17. An apparatus as defined in claim 13 wherein said combination includes another cam follower-guide mechanism comprising a plurality of cam guide means and a plurality of cain follower means; wherein each of the plurality of cam follower means is secured to the other end face of each of the plurality of vanes, and the plurality of cam guide means are included in an end face of another cam disc disposed adjacent to the other of the two opposite end faces of the vane assembly rotatably about said cam axis,in a radially extending relationship from said cam axis; wherein each of the cam follower means extends from said the other end face of each of the plurality of vanes and engages each of the plurality of cam guide means in a sliding relationship.

18. An apparatus as defined in claim 17 wherein said combination includes means for measuring rotary speed of the combination of the vane assembly and the cam follower-guide mechanism as a measure of flow rate of fluid media moving through the apparatus.

19. An apparatus as defined in claim 17 wherein said combination includes means for transmitting power from and to the combination of the vane assembly and the cam follower-guide mechanism.

20. An apparatus as defined in claim 17 wherein one of the two diametrically opposite portions of the cylindrical wall of the cylindrical cavity extends over an angle about the shaft at least substantially equal to the minimum separation angle between adjacent pair of the vanes occurring during rotation of the vane assembly, and the other of the two diametrically opposite portions of the cylindrical wall of the cylindrical cavity extends over an angle about the shaft at least substantially equal to the maximum separation angle between adjacent pair of the vanes occurring during rotation of the vane assembly about the shaft

* * * * *